June 2, 1964  J. A. ALFES  3,135,559
WHEEL MOUNTED STONE EJECTOR
Filed Nov. 5, 1962  2 Sheets-Sheet 1

INVENTOR.
John C. Alfes
BY
E. E. James
ATTORNEY

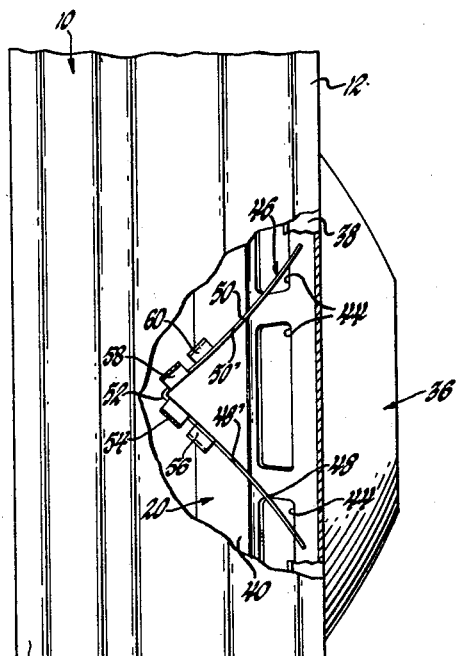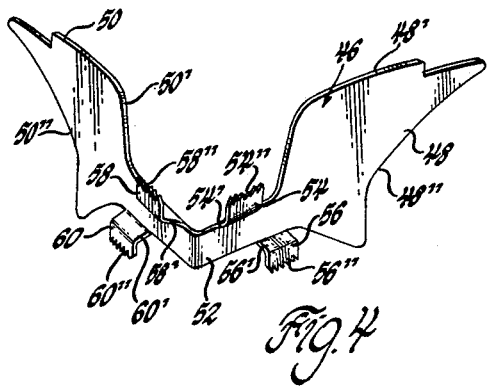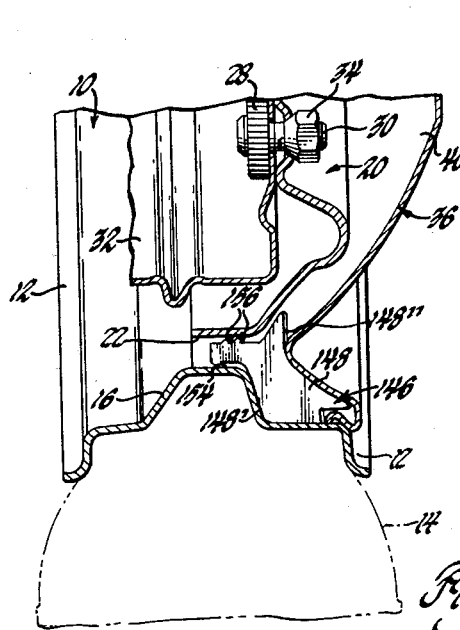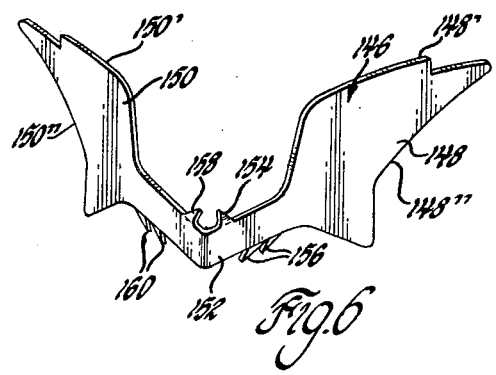

3,135,559
WHEEL MOUNTED STONE EJECTOR
John A. Alfes, Pontiac, Mich., assignor to General Motors Corporation, Detroit, Mich., a corporation of Delaware
Filed Nov. 5, 1962, Ser. No. 235,499
6 Claims. (Cl. 301—63)

This invention relates to a wheel for a motor vehicle and more particularly to such a fabricated wheel of the so-called open spider type having a cover disc of the type secured within and extending transversely of the tire mounting rim of the wheel.

The spider of a wheel of the type indicated is provided with a plurality of angularly spaced peripheral recesses. In assembly the tire mounting rim is secured to the intermediate peripheral portions of the spider and cooperates with the several recesses to define a plurality of arcuate openings therebetween. Wheel discs of the type indicated may also be provided with similar openings in their peripheral portions. During vehicle operation, stones are frequently deflected through openings provided in the wheel and cover and into the space defined therebetween. Such a trapped stone generates an extremely loud, harsh and disconcerting noise in its movement relative to the wheel and cover. Prior to the instant invention, removal of such a trapped stone to prevent the annoying stone noise generated has generally required stopping of the vehicle, removal of the wheel cover disc and reinstallation of the cover after removal of the stone.

The inventiion particularly contemplates the use of a vane member mountable on the wheel and operable to eject such trapped stones through the openings of the wheel and cover. In the several illustrative embodiments of the invention, a V'd butterfly-shaped vane member is insertable into and resiliently locked within at least one of the openings defined between the rim and spider of a wheel of the typpe indicated. The V'd blades of the vane member engage the wheel rim and the opposing surface of the cover and are sloped to roll any trapped stone downwardly and outwardly through the adjacent wheel or opening as the wheel is rotated in either direction. Where the wheel cover is of perforated design, the ejector vane may also eject any such trapped stones outwardly through an adjacent opening in the cover.

The foregoing and other objects, advantages and features of the invention will be apparent from the following description, having reference to the accompanying drawings, in which:

FIGURE 3 is a top elevational view of the wheel assembly of FIGURE 1 with portions thereof broken away substantially in the direction of the arrows and in the plane of the line indicated at 3—3 of FIGURE 1;

FIGURE 4 is a perspective view of the stone ejector vane member shown in FIGURES 1–3;

FIGURE 5 is similar to a portion of FIGURE 1 and shows the wheel mounting of a slightly modified form of stone ejecting vane member;

FIGURE 6 is a perspective view showing the vane member of FIGURE 5 in perspective elevation.

Figure 1:
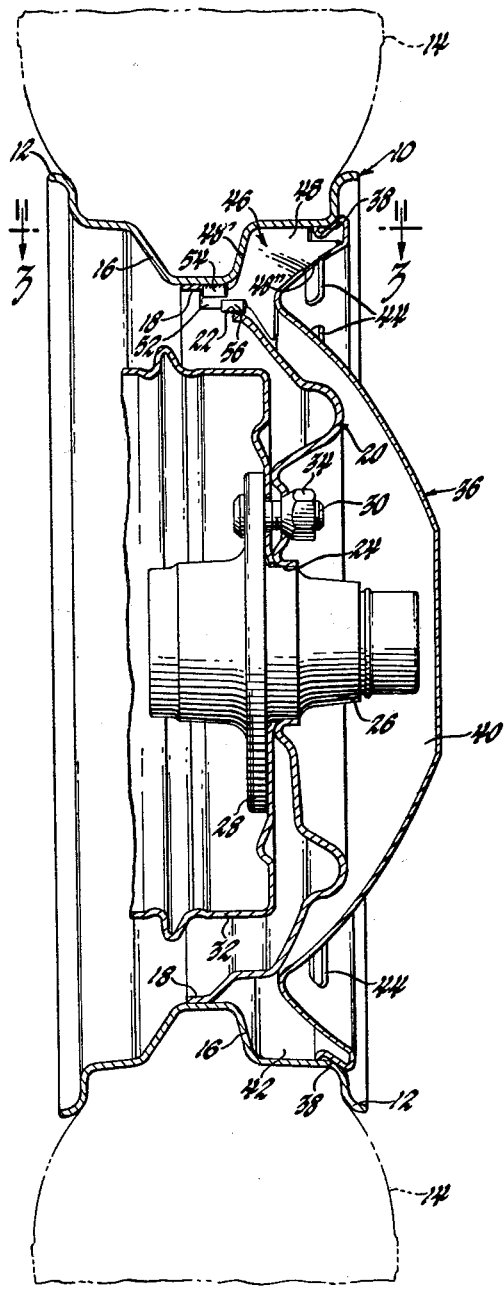
FIGURE 1 is a sectional view through a motor vehicle wheel of the type indicated and a cover disc mounted thereon and shows one form of the stone ejecting vane member of the invention mounted therebetween.

Referring more particularly to the drawings, a conventional wheel assembly of the type indicated is identified by the reference numeral 10. This wheel assembly comprises a rim 12 of channel section adapted to mount a tire shown in phantom line at 14. The rim 12 is provided with an inwardly extending annular boss 16. The inner land or base flange of this boss is suitably secured to the angularly spaced outer peripheral portions 18 of a rim supporting spider 20. As indicated above, this spider is of the so-called open type to facilitate wheel manufacture and has a plurality of recesses extending arcuately between the rim mounting peripheral portions 18. These recesses cooperate with the rim 12 to define a plurality of angularly spaced wheel openings 22. The inner portion of the spider 20 is centrally perforated at 24 to embrace a flanged hub 26 suitably mountable on an associated vehicle axle, not shown. The flange 28 of the hub carries a plurality of equiangularly spaced studs 30. These studs extend through similarly spaced holes in an associated brake housing 32 and the inner portion of the spider 20 and serve to secure these members to the flanged hub by means of beveled nuts 34 threadable thereon.

Figure 2:
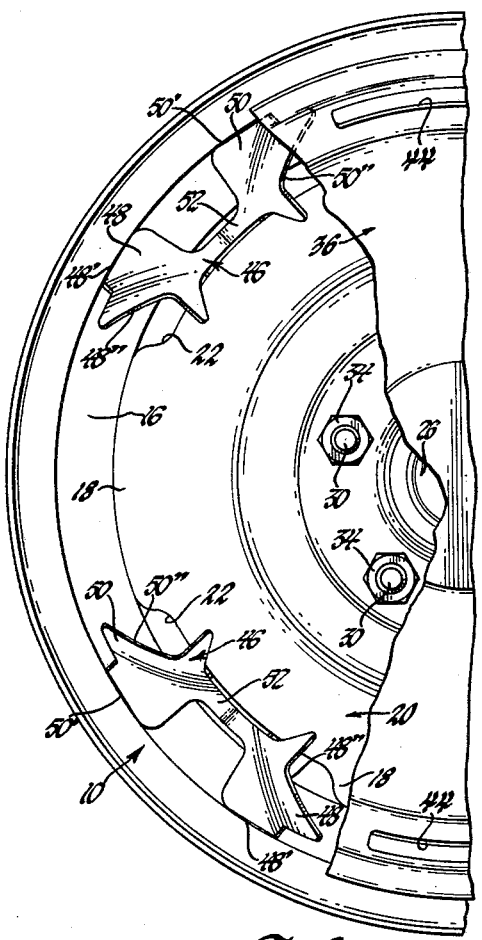
FIGURE 2 is a fragmentary side elevational view of the wheel assembly of FIGURE 1 with portions of the wheel cover broken away to show the stone ejecting member mounted in several of the wheel defined openings.

A decorative wheel cover 36 is mounted on the wheel 10 in a conventional manner, the outer periphery of the cover having a reverse lip 38 resiliently engaging and locking the cover to the outer undercorner of the tire mounting axial flange of the rim 12. The cover 36 encloses the hub 26, the spider and its mounting studs and bolts, as well as the spider mounted inner portions of the rim. The wheel and cover thus cooperate to define a circular chamber 40 having an annular outer portion 42 defined between the cover disc and the opposing surfaces of the wheel rim and the outer peripheral portion of the spider 20. The periphery of the cover disc may be provided with an annular belt of spaced openings as shown at 44 in FIGURES 1–3.

In accordance with the invention, at least one stone ejecting vane member is mounted for rotation with the wheel in the annular chamber portion 42 defined between the wheel and the cover disc. In the embodiment of FIGURES 1–4, this member is indicated generally by the reference numeral 46. As best seen in FIGURES 3 and 4, the stone ejecting member is preferably stamped from suitable sheet metal stock and comprises two V'd blades or vane portions 48 and 50 joined by a narrow V'd bight portion 52. The bight portion is insertable into and preferably bisects one of the openings defined between the rim and spider thereby mounting the vane member on the wheel. The blade portions 48 and 50 each have a first edge 48' and 50', respectively, engageable with the adjacent radial and axial inner surfaces of the tire mounting rim between the wheel spider and the cover disc. A second edge 48" and 50" formed on each blade portions opposite its bight portion in engageable with the inner surface of the wheel cover immediately adjacent the wheel rim. The configurations of the V'd blade portions 48 and 50 thus cooperate with the engaged inner surfaces of the tire mounting rim and of the wheel cover disc to scoop and roll any stones deflected into the chamber therebetween outwardly through one of the adjacent openings provided in the perforated spider or wheel cover disc. Such stone engagement and subsequent rolling ejection occurs upon accelerating or decelerating rotation of the vehicle wheel relative to such a trapped stone in either direction as the wheel mounted vane member passes between a position corresponding to that of the lower vane member shown in FIGURE 2 to the position shown by the upper vane member.

For the purpose of securing each vane member 46 within one of the spider and rim defined openings 22, the V'd bight portion 52 of the vane member may be provided with opposing offset tangs 54, 56 and 58, 60. These tangs each include a resilient arm portion 54', 56', 58' and 60', respectively, depending from the opposite wheel engaging edges of the bight portion 52 and an upstanding arm having serrated securing edges indicated 54", 56", 58" and 60" respectively. Upon insertion of the vane member 46 into one of the wheel defined openings, the several tangs thus serve to resiliently engage and bite into the adjacent metal of the wheel rim boss and of the spider to lock the vane member in place.

In the embodiment of the invention shown in FIGURES 5 and 6, the stone ejecting member is substantially the same as that described above except for the vane securing means provided on the V'd bight portion. The portions of this alternate form of vane member have thus been identified by adding 100 to the reference numeral of the corresponding portion of the vane member shown in FIGURES 1 to 4. The bight portion 152 of the vane member 146 is provided with opposing offset barbs or tangs 154, 156 and 158, 160. These barbs are inclined to the bight portion and adapted to resiliently bite and secure the vane member in its proper mounted position within the opening defining portions of the wheel rim and spider.

From the foregoing description of the several illustrative embodiments, it will be seen that the invention provides a relatively simple inexpensive accessory attachment adapted to remove any stones from between an open spider vehicle wheel and a cover disc mounted thereon thereby providing a simple means for preventing the generation of harsh disconcerting noise by such stones. It will be further apparent that various modifications may be made in and from the disclosed stone ejecting members without departing from the spirit and scope of the invention as defined in the following claims.

I claim:
1. In combination with a motor vehicle wheel of open spider type having a plurality of openings defined between the spider and the tire mounting rim of the wheel and a wheel cover disc secured within the inner surface of the tire mounting rim of the wheel, a stone ejecting member comprising a pair of V'd vane portions oppositely inclined to wheel rotation and joined by a tanged bight portion resiliently locked within one of the openings defined between the tire mounting rim and the open spider of the wheel, said vane portions having a first edge engaging the inner surface of the tire mounting rim inwardly of the wheel cover disc and having a second edge opposite the bight portion thereof engaging the opposing inner surface of the wheel cover disc and said vane portions cooperating with the engaged inner surfaces of the tire mounting rim and wheel cover disc upon rotation of the wheel to roll any stone trapped therebetween outwardly through the adjacent openings provided in the wheel.

2. In combination with a wheel member for a motor vehicle having a spider disc and an annular tire mounting rim secured thereto and a wheel cover disc secured to the tire mounting rim of the wheel, said wheel and cover disc defining a chamber therebetween and at least one of said discs defining a plurality of ports opening to the periphery of said chamber, a stone ejecting member comprising a pair of V'd blade portions oppositely inclined to wheel rotation and joined by a tanged bight portion inserted into and resiliently locked within one of the ports opening to said chamber, the blade portions of said ejecting member each having one edge engaging the inner surface of the wheel rim between the wheel spider and cover discs and having a second edge engaging the inner surface of the wheel cover disc opposite said bight portion and said vanes cooperating with the engaged inner surfaces of the said wheel rim and cover disc and being shaped to roll any stone deflected into and trapped within said chamber outwardly through one of the adjacent openings provided in the wheel and cover disc upon accelerating or decelerating rotation of the wheel relative to such trapped stone.

3. A member for ejecting stones trapped between a fabricated metal wheel for a motor vehicle having a perforated spider and a tire mounting rim and a wheel cover disc secured to the rim of the wheel to define a chamber therebetween, said stone ejecting member comprising a portion insertable into mounting engagement within one of the openings defined by the perforated spider of the wheel and a vane portion inclinable to wheel rotation in its mounting on the wheel, said vane portion being shaped to conform outwardly to the configuration of the inner surface of the tire mounting rim between the wheel spider and the cover disc and to cooperate therewith to scoop and roll any stone trapped in the chamber therebetween outwardly through the adjacent opening provided in the perforated spider upon rotation of the vehicle wheel.

4. A stone ejecting vane member for a motor vehicle wheel having a perforated metal spider and a tire mounting rim mounted thereon and having a wheel cover disc secured to the rim of the wheel and defining a chamber therebetween, said vane member including two blade portions V'd and joined by a bight portion mountable on the wheel to incline the blade portions oppositely to alternate wheel rotation, said blade portions each having a first edge engageable with the inner surface of the tire mounting rim between the wheel spider and the cover disc and having a second edge opposite the bight portion thereof engageable with the rim adjacent inner surface of the wheel cover disc, and said V'd blade portions being shaped to cooperate with the inner surfaces of the tire mounting rim and wheel cover disc engageable therewith to scoop and roll any stone trapped therebetween outwardly through an adjacent opening provided in the perforated spider upon rotation of the vehicle wheel in opposite directions.

5. A stone ejecting vane member for a motor vehicle wheel as set forth in claim 4, said member being of stamped configuration and said bight portion having a plurality of opposed resilient tangs depending therefrom and insertable into resilient vane mounting engagement within one of the openings defined by the perforated spider of the wheel.

6. A stone ejecting vane member for a motor vehicle wheel as set forth in claim 4, said member being of stamped configuration and said bight portion being oppositely barbed and insertable in vane mounting engagement within one of the openings defined by the perforated spider of the wheel.

References Cited in the file of this patent
UNITED STATES PATENTS

| | | |
|---|---|---|
| 1,906,520 | Bode | May 2, 1933 |
| 2,386,231 | Lyon | Oct. 9, 1945 |
| 2,411,164 | Lyon | Nov. 19, 1946 |
| 2,698,204 | Poupitch | Dec. 28, 1954 |
| 2,785,777 | Horn | Mar. 19, 1957 |
| 2,822,894 | Lyon | Feb. 11, 1958 |
| 2,870,879 | Gaylord | Jan. 27, 1959 |

FOREIGN PATENTS

| | | |
|---|---|---|
| 517,856 | Italy | Mar. 3, 1955 |